(12) United States Patent
Zoubir

(10) Patent No.: US 8,274,429 B2
(45) Date of Patent: Sep. 25, 2012

(54) WIRELESS COMMUNICATION SYSTEMS AND METHODS WITH SOURCE LOCALIZATION AND SELF-CALIBRATION

(76) Inventor: Ahmed Zoubir, Ramonville Saint Agne (FR)

( * ) Notice: Subject to any disclaimer, the term of this patent is extended or adjusted under 35 U.S.C. 154(b) by 0 days.

(21) Appl. No.: 13/211,170

(22) Filed: Aug. 16, 2011

(65) Prior Publication Data

US 2012/0009942 A1    Jan. 12, 2012

Related U.S. Application Data

(63) Continuation of application No. PCT/IB2009/005392, filed on Feb. 16, 2009.

(51) Int. Cl.
   *G01S 7/40* (2006.01)
(52) U.S. Cl. .................................................. 342/174
(58) Field of Classification Search ................... 342/174
   See application file for complete search history.

(56) References Cited

U.S. PATENT DOCUMENTS

| 6,462,704 | B2 | 10/2002 | Rexberg et al. | |
| 7,822,147 | B2 * | 10/2010 | Huang et al. | 375/296 |
| 8,125,388 | B2 * | 2/2012 | Kennedy et al. | 342/417 |
| 2003/0012262 | A1 | 1/2003 | Ribeiro et al. | |
| 2005/0078763 | A1 * | 4/2005 | Choi et al. | 375/267 |
| 2006/0133548 | A1 * | 6/2006 | Oh et al. | 375/346 |
| 2007/0159162 | A1 * | 7/2007 | Kang et al. | 324/158.1 |
| 2008/0143562 | A1 * | 6/2008 | Huang et al. | 341/118 |
| 2012/0009942 | A1 * | 1/2012 | Zoubir | 455/456.1 |

FOREIGN PATENT DOCUMENTS

WO    WO 2010092421 A1 *  8/2010

OTHER PUBLICATIONS

Yang, K.; Liao, G.; Bao, Z.; , "Auto-calibration for sensor gain/phase perturbations via exploitation of antenna arrays' symmetry property," Statistical Signal and Array Processing, 1998. Proceedings., Ninth IEEE SP Workshop on , vol., No., pp. 240-243, Sep. 14-16, 1998.*
Wu, Y.W.; , "Estimating directions of arrival with generalized MUSIC using a linear-interpolated array manifold," Acoustics, Speech, and Signal Processing, 1991. ICASSP-91., 1991 International Conference on , vol., No., pp. 3333-3336 vol .5, Apr. 14-17, 1991.*

(Continued)

*Primary Examiner* — John B Sotomayor
(74) *Attorney, Agent, or Firm* — Finnegan, Henderson, Farabow, Garrett & Dunner, LLP

(57) ABSTRACT

Computer-implemented systems and methods are provided for source-localization and self-calibration for an array of antenna elements. In one implementation, a method is provided that includes estimating directions of arrival of a plurality of signals received by a plurality of antenna elements of the array of antenna elements and identifying a target signal from among the plurality of received signals. The method may also include estimating complex gain of each of the plurality of antenna elements in a direction of arrival of the identified target signal, wherein the estimation of the complex gain of each the plurality of antenna elements is performed after estimating the directions of arrival of signals received by the plurality of antenna elements.

34 Claims, 6 Drawing Sheets

OTHER PUBLICATIONS

Fujimoto, M.; Ohaka, S.; Hori, T.; , "DOA estimation without antenna characteristics calibration for UWB signal by using sub-band processing," Wireless Information Technology and Systems (ICWITS), 2010 IEEE International Conference on , vol., No., pp. 1-4, Aug. 28-Sep. 3, 2010.*

A self calibration technique for a DOA array in the presence of mutual coupling and resonant scatterers Horiki, Yasutaka. Proquest Dissertations and Theses 2006. Section 0168, Part 0544 112 pages; [Ph.D. dissertation].United States—Ohio: The Ohio State University; 2006. Publication No. AAT 3230922.*

International Search Report from the U.S. Patent Office for International Application No. PCT/IB2009/005392 mailed Oct. 2, 2009.

* cited by examiner

WIRELESS COMMUNICATION SYSTEMS AND METHODS WITH SOURCE LOCALIZATION AND SELF-CALIBRATION

CROSS REFERENCE TO RELATED APPLICATION

This application is a continuation of International Application No. PCT/IB2009/005392 filed on Feb. 16, 2009, the contents of which are incorporated herein by reference.

TECHNICAL FIELD

The present disclosure generally relates to the field of communications and source localization schemes for wireless communication systems that employ, for example, antennas. More particularly, and without limitation, the present disclosure relates to systems and methods for estimating target source locations and self-calibration of antenna arrays.

BACKGROUND

Most modern wireless communication systems, such as, for example, cellular voice/video/data telecommunication networks, satellite audio/video/data communication systems, RF and/or microwave data communication systems, GPS positioning systems, and radar- and sonar-based communication systems, comprise a plurality of geographically dispersed receiver units, which can communicate with one or more centralized, high-power satellite or terrestrial communication stations. Often, as is the case of hand-held cellular telephone transceivers, one or more of the receiver units are portable, and may move relative to one or more satellite or terrestrial communication stations. Alternatively or additionally, as is the case with non-geosynchronous, semi-synchronous, or sub-synchronous satellite communication stations, one or more of the communication stations may be mobile, and may move relative to one or more of the receiver units.

As wireless networks grow, the flexibility of the receiver units and communication stations to move relative to one another increases. Such flexibility of movement may increase the range of a wireless network, potentially enhancing the effective coverage areas of the wireless network. Such enhanced coverage areas may provide greater range for existing network service subscribers and/or may extend coverage to potential customers, who may not have been otherwise able to communicate with the network.

Although increasing the mobility of receiver units and/or communication stations may increase the coverage area of a wireless network, such increases may bear the cost of decreased quality of service (QoS) for certain wireless communication services. For example, wireless communication links rely heavily on the use of antenna and other signal detection devices to discriminate between legitimate (i.e., desired) communication signals and illegitimate (and potentially interfering) communication signals (i.e., undesired signals from other communication networks, "noise", etc.). Because distance variations may interfere with the alignment between antenna elements and a target source, the ability of antenna elements and signal detection devices to discern between legitimate and illegitimate signals may become impaired when the distance between receiver units and communication stations varies. In some situations, changes in position of an antenna of a receiver unit relative to the communication station may cause an otherwise legitimate signal to fall within a blind cone or "null" of the radiation pattern. If the antenna element (or radiation pattern associated therewith) is not re-directed so that a pole of the antenna element is properly aligned with the source, all or part of the legitimate communication signal may be lost.

Furthermore, certain voice, video, and data services, such as, for example, voice communications, Internet data services, and streaming audio/video services (such as Internet radio and television), require large amounts of bandwidth. Support of such high-bandwidth services requires a communication network that is capable of continuously maintaining relatively high data transfer rates for long periods of time. Thus, the ability to support these high-bandwidth services over a wireless connection requires a wireless network that is capable of establishing and maintaining a relatively strong, uninterrupted wireless communication channel between a target source (satellite or terrestrial communication station) and an antenna of a receiver unit. Furthermore, if the wireless network is susceptible to changes in the position of the receiver unit relative to the communication station or vice versa, a system for compensating for such relative changes may be required to maintain the strength of the wireless communication channel.

One solution for compensating for changes in the relative position of one or more receiver units and communication stations is to continually monitor the directionality of the antenna of the receiver unit and the position of the source. Based on changes of the directionality of the antenna relative to the position of the source, the orientation of the antenna may be physically adjusted so that the radiation pattern of the antenna is oriented so as to maximize the potential for intercepting desired signals radiated from the source. However, physical adjustment of the antenna typically requires the use of mechanical motors, which require periodic maintenance and repair. Such maintenance can be costly, particularly when the antenna is not easily accessible and/or exposed to harsh environments. Additionally, mechanical adjustment of an antenna can be an extremely slow process, particularly when rapid and often dramatic changes in directionality are required.

As a further drawback, the use of mechanical motors and other components typically requires a significant increase in the size and weight of the antenna, which can prove costly in certain applications where component size and weight increases are particularly problematic. For example, aerospace and aeronautical applications may be particularly sensitive to increases in weight and wind resistance caused by increases in the size and weight of antenna components.

Another solution for compensating for changes in the relative position of one or more receiver units and communication stations involves the use of mathematical processing to analyze signals incident upon an array of antenna elements. Specifically, signals received by the array of antenna elements are analyzed to estimate, among other things, the direction of arrival (DOA) of signals transmitted from a legitimate source and beam patterns of the array elements in the direction of the legitimate source. Once the DOA and beam patterns have been estimated, the polarization pattern of each of the array elements can be mathematically manipulated to facilitate receipt of signals from the legitimate source, while cancelling or "nulling" illegitimate signals.

Many algorithms have been proposed to estimate arrival angles of wavefronts based upon measurements of signals incident upon an antenna. For example, the Multiple Signal Classification (or "MUSIC") and the Estimation of Signal Parameters via Rotational Invariance Techniques (or "ESPRIT") algorithms are usually used because of their high resolution property. However, to operate effectively, existing algorithms require knowledge of the complex gain of each antenna element at the time when signals are received. Because it is impractical to know the instantaneous complex gains of the antenna elements, especially when a large number of antenna elements is used, operating in a real-world or non-ideal application, these algorithms may not be effective in practical applications.

Furthermore, in applications that employ antenna arrays that have a large number of antenna elements, each of which receive signals that are subjected to sophisticated analytical and statistical processing to identify the location of a legitimate source, the element-space processing performed by existing algorithms may be overly complicated, inefficient, and/or require a significant allocation of processing resources. To overcome these problems, beam-space processing can be used to transform the actual received data vector on another, much smaller vector. However, conventional beam-space processors are designed only for the case of omnidirectional antenna elements and can not be used when each antenna element has its own, unique complex gain.

The present disclosure is directed toward overcoming one or more of the above-mentioned problems and drawbacks. Among other things, the present disclosure proposes efficient techniques that are based on the decoupled estimation of the DOA of sources from the estimation of the complex gains associated with the antenna elements.

SUMMARY

In accordance with one aspect, the present disclosure is directed toward a computer-implemented method for source-localization and self-calibration for an array of antenna elements. The method may comprise estimating, by a processor, directions of arrival of a plurality of signals received by an antenna element of the array of antenna elements and identifying a target signal from among the plurality of received signals. The method may also comprise estimating, by a processor, the complex gain of the antenna element in a direction of arrival of the identified target signal, wherein the estimation of the complex gain of the antenna element is performed after estimating the directions of arrival of signals received by the antenna element.

According to another aspect, the present disclosure is directed toward a wireless transceiver system comprising an antenna including an array of antenna elements and a signal processing system electrically coupled to each of the plurality of array elements. The signal processing system may include an array processor configured to estimate directions of arrival of a plurality of signals received by an antenna element of the array of antenna elements. The array processor may also be configured to identify a target signal from among the plurality of received signals and estimate a location of a target source associated with the target signal. In addition, the array processor may be configured to estimate the complex gain of the antenna element in a direction of the location of the target source, wherein the estimation of the complex gain of the antenna element is performed after estimating the location of the target source.

In accordance with yet another aspect, the present disclosure is directed toward a computer-readable medium for use on a computer system, the computer-readable medium including computer-executable instructions for performing a method for source-localization and self-calibration for an array of antenna elements. The method may comprise estimating directions of arrival of a plurality of signals received by an antenna element of the array of antenna elements and identifying a target signal from among the plurality of received signals. The method also comprises estimating the complex gain of the antenna element in a direction of arrival of the identified target signal, wherein the estimation of the complex gain of the antenna element is performed after the estimating the directions of arrival of signals received by the antenna element.

Additional aspects of the present disclosure are directed to a method, executed by a processor, for determining a location of a target source and estimating complex gains for an array of antenna elements based on the location of the target source. The method may comprise selecting a sample number of antenna elements to be analyzed and determining an initial estimate of a location of a target source. The method may also include estimating directions of arrival of a first plurality of signals received by the selected antenna elements and identifying a target signal from among the first plurality of received signals. In addition, direction of arrival and complex gain parameters associated with each of the selected antenna elements may be estimated based on the target signal identified from among the first plurality of received signals. The method may further include estimating directions of arrival of a second plurality of signals received by the selected antenna elements and identifying the target signal from among the second plurality of received signals. Direction of arrival and complex gain parameters associated with each of the selected antenna elements may be re-estimated based on the target signal identified from among the second plurality of received signals. The method may also include determining whether the estimated direction of arrival and complex gain parameters and the re-estimated direction of arrival and complex gain parameters converge to threshold values. If the estimated and re-estimated parameters converge to threshold values, the direction of arrival and complex gain parameters may be established for each antenna element of the array of antenna elements as the estimated direction of arrival and complex gain parameters for the selected antenna elements.

Additional objects and advantages of the disclosure will be set forth in part in the description which follows, and in part will be obvious from the description, or may be learned by practice of the disclosure. The objects and advantages described herein will be realized and attained by means of the elements and combinations particularly pointed out in the appended claims.

It is to be understood that both the foregoing general description and the following detailed description are exemplary and explanatory only and are not restrictive of the subject matter disclosed herein, as claimed.

The accompanying drawings, which are incorporated in and constitute a part of this specification, illustrate several embodiments consistent with the present disclosure and together with the description, serve to explain the principles of described herein.

DESCRIPTION OF THE EMBODIMENTS

Reference will now be made in detail to the exemplary embodiments, examples of which are illustrated in the accompanying drawings. Wherever possible, the same reference numbers will be used throughout the drawings to refer to the same or like parts.

Figure 1:
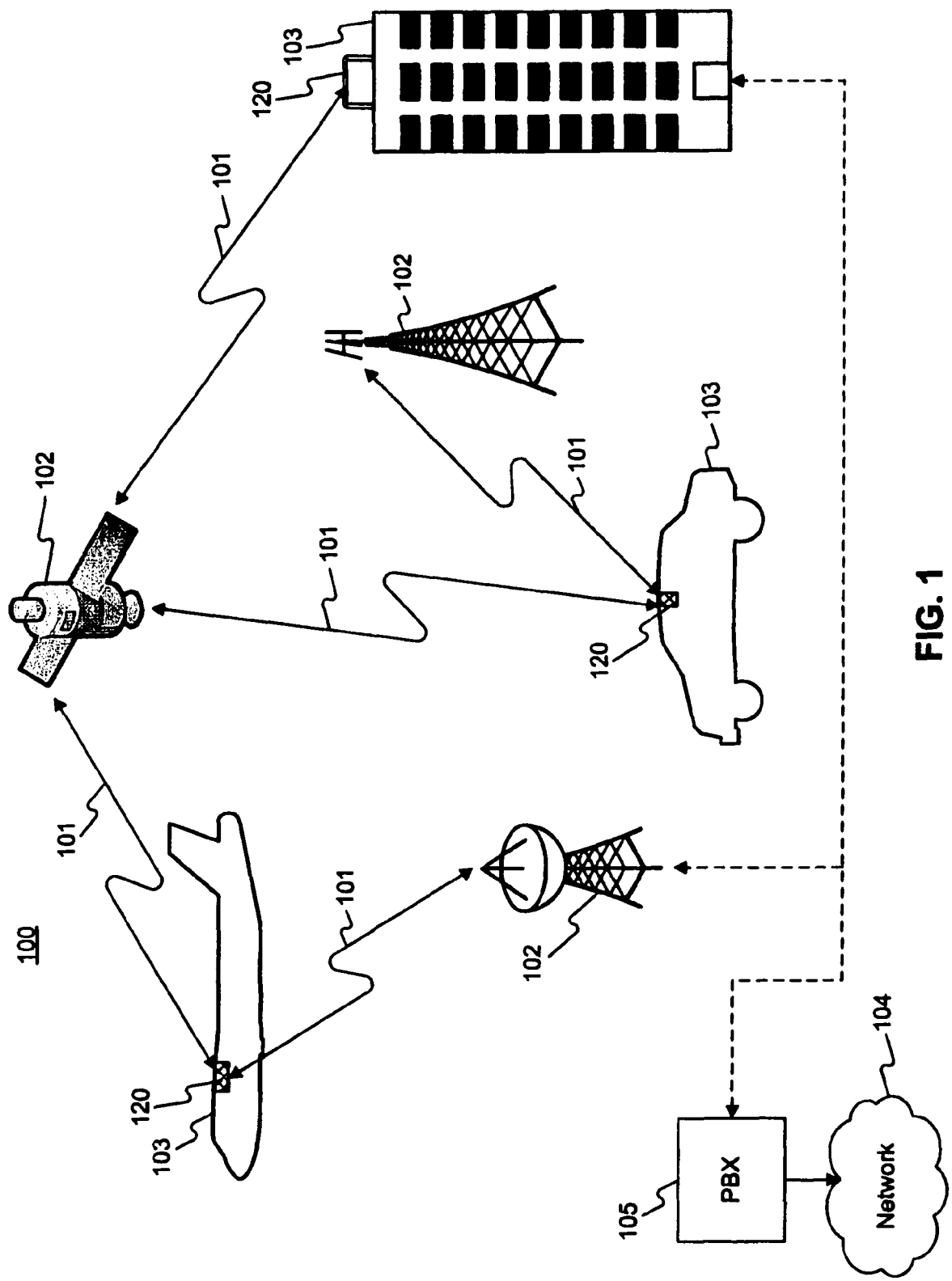
FIG. 1 illustrates an exemplary wireless communication network, in which systems and methods consistent with the disclosed embodiments may be implemented.

FIG. 1 illustrates an exemplary wireless communication network 100, in which systems and methods consistent with the disclosed embodiments may be implemented. Wireless communication network 100 may embody any communication system that employs a wireless communication link 101 to support at least a portion of the voice, video, and/or data traffic that is carried by the wireless communication network. In accordance with one embodiment, wireless communication network 100 comprises at least one communication station 102 for communicating data to one or more receiver units 103 via wireless communication link 101.

Communication station 102 may embody one or more transceiver devices that are configured for wireless communication with a plurality of receiver units 103 and/or one or more other communication stations 102a-102n (not shown). As illustrated in FIG. 1, communication station 102 may embody one or more of a transceiver mounted a satellite that is in geosynchronous, non-geosynchronous, semi-synchronous, or sub-synchronous orbit about the Earth. Alternatively, and as also illustrated in FIG. 1, communication station 102 may be a terrestrial-based communication tower such as, for example, a cellular-based network communication tower and/or a dish-type communication transceiver.

Communication station 102 may be in wireless communication with one or more receiver units 103 and may include processing equipment (see, for example, FIG. 3) configured to facilitate communication between or among the one or more receiver units 103 via wireless communication links 101. For example, communication station 102 may comprise a satellite that is configured to facilitate wireless voice communication between a first receiver unit 103 located in an automobile and a second receiver unit 103 located on an airplane. Alternatively or additionally, a terrestrial-based, dish type communication station may be configured to facilitate wireless video or data communication between a receiver unit 103 located on an airplane and a terrestrial-based data server (not shown) connected to a conventional wireline or similar network 104.

Each receiver unit 103 may embody any suitable stationary, mobile, or portable communication device that may be configured to provide at least one of voice, video, and data communication via wireless communication link 101. According to one embodiment, receiver unit 103 may be a wireless transceiver located aboard a commercial airplane. Alternatively or additionally, receiver unit 103 may be a portable personal cellular communication device (not shown). According to yet another embodiment, receiver unit 103 may embody a mobile video transceiver located aboard a passenger vehicle and configured to support satellite-based video or radio service. In accordance with yet another embodiment, receiver unit 103 may be located on a building and configured to support high-speed wireless voice, video, and/or data communication for a plurality of occupants located therein. It is contemplated that the types of receiver units 103 listed above are exemplary only and not intended to be limiting. Accordingly, it is contemplated that additional, fewer, and or different types of receiver units 103 may be supported by wireless communication network 100 without departing from the scope of the present disclosure.

As illustrated in FIG. 1, wireless communication network 100 may include and/or interface with a conventional wireline communication network 104, thereby enabling the transport of wireless communication voice/video/data signals over conventional wire-based services (e.g., POTS, VoIP, ISDN, Internet, etc.). Wireless communication network 100 may interface with wireline communication network 104 either directly or through an intermediate network. By way of example and as illustrated in FIG. 1, one or more of communication stations 102 may interface with network 104 through a public (or private) exchange server (PBX) 105, which may be configured to convert the wireless communication signals into signals appropriate for high-speed transport across network 104.

Figure 2:
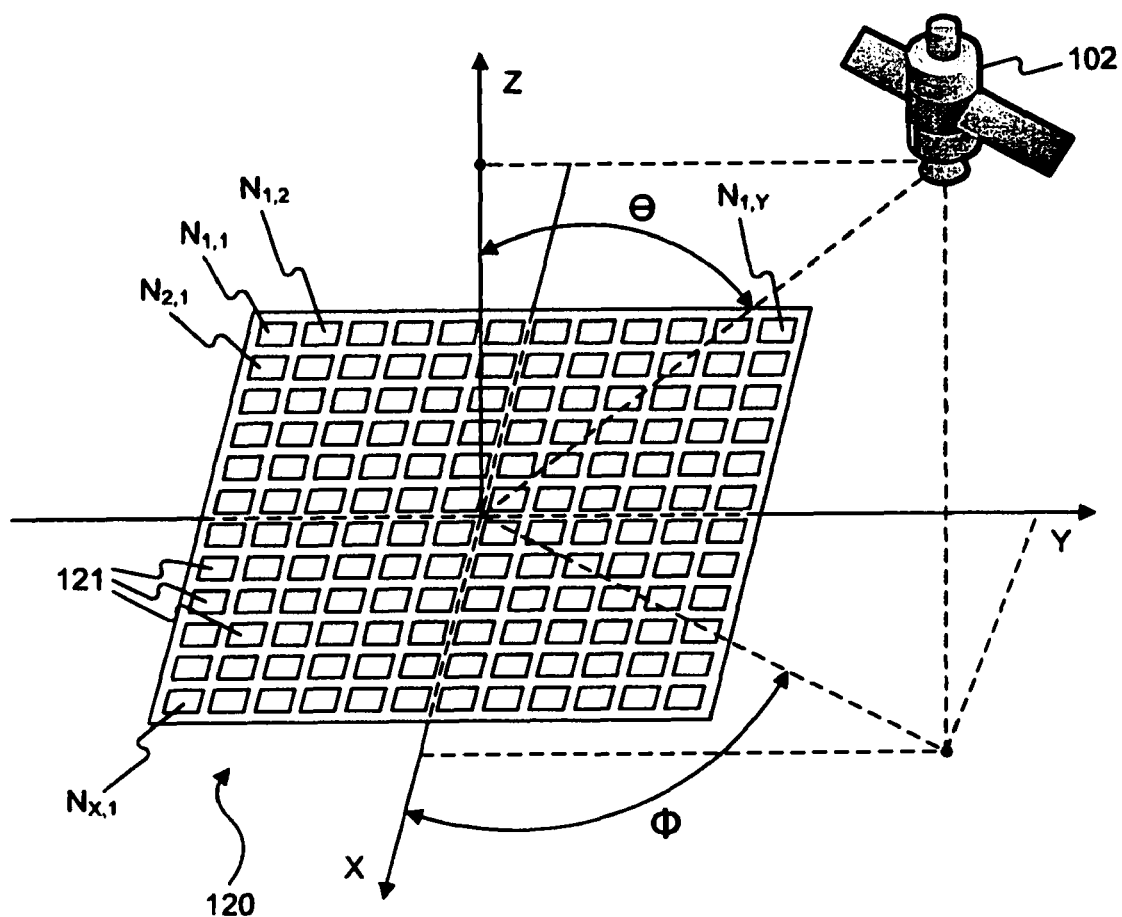
FIG. 2 illustrates a portion of the exemplary wireless communication network shown in FIG. 1 and includes a perspective view of an exemplary array of antenna elements associated with a receiver unit of a wireless communication network.

Each of centralized communication stations 102 and receiver units 103 may include a wireless transceiver system that includes an antenna and a signal processing system for analyzing and processing signals received by the antenna. By way of example, FIG. 2 illustrates an exemplary antenna 120 that may be employed in one or more of communication stations 102 and receiver units 103. For purposes of illustration, FIGS. 3 and 4 further provide block diagrams depicting an exemplary wireless transceiver system 300 and array processor 310, respectively.

As illustrated in FIG. 2, antenna 120 comprises a plurality of array elements 121 situated in a common plane. The plurality of array elements 121 may be arranged in any pattern and using any predetermined spacing between elements. In the example of FIG. 2, the plurality of array elements 12 are arranged in a rectangular pattern with hail free space wavelength spacing between elements. Also, each of the plurality of array elements 121 is coupled to a common source and/or load (shown in FIG. 3 as transmit/receive module 320) to produce a directional radiation pattern. The directional radiation pattern of antenna 120 may be manipulated by controlling the amplitude and phase of electrical energy that is applied to each of the plurality of array elements 121. Accordingly, the radiation pattern of antenna 120 may be electrically "aimed" to effectively reinforce signals in the direction of a desired target source (e.g., a particular communication station 102), while suppressing all other undesired or illegitimate signals (e.g., signals generated by competing communication stations, noise, interference, etc.).

Figure 3:
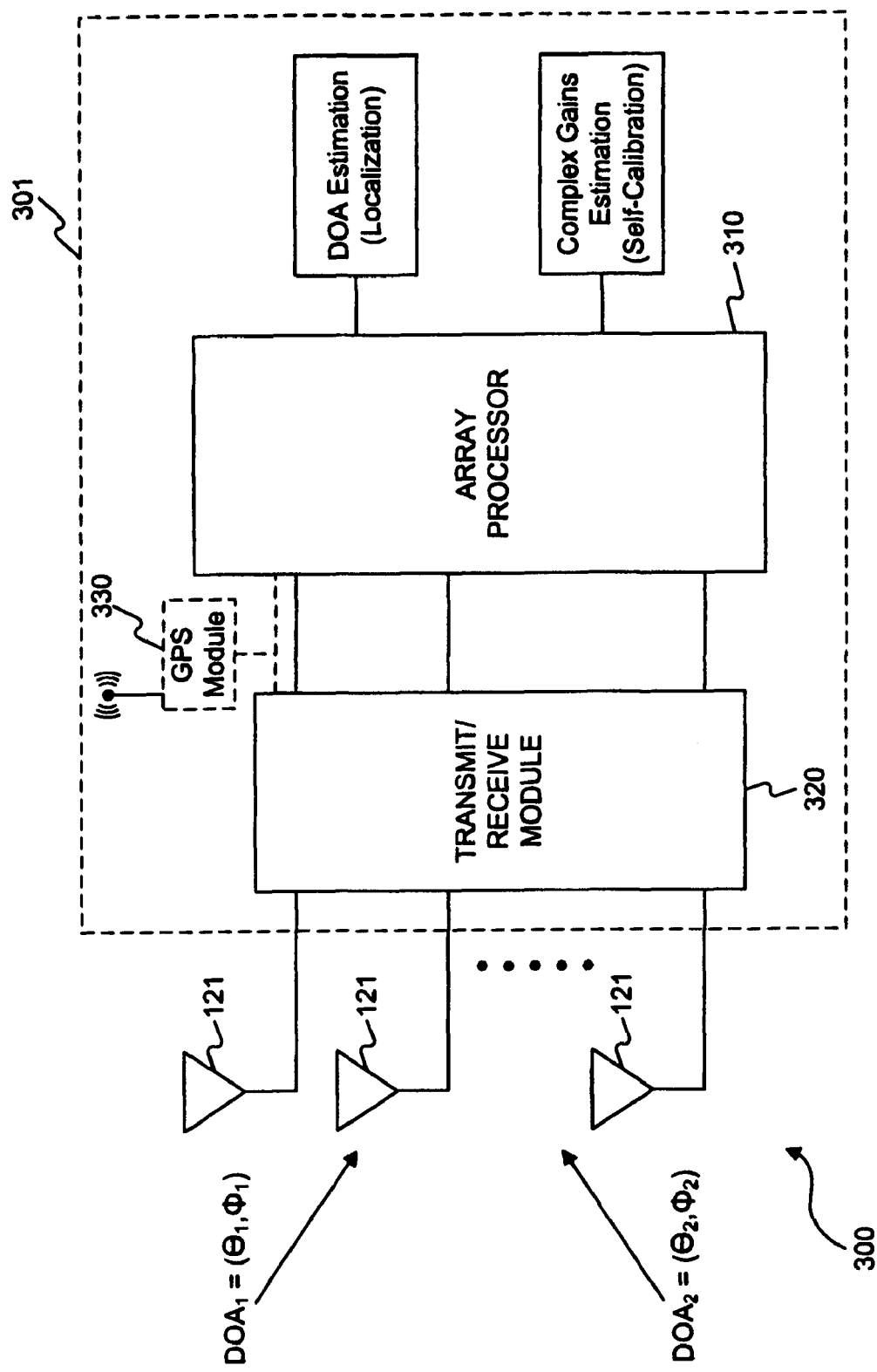
FIG. 3 illustrates another portion of the exemplary wireless communication network shown in FIG. 1 and includes a block diagram of a signal processing system, consistent with the disclosed embodiments.

With respect to antenna 120, each of the plurality of array elements 121 is configured to detect, receive, collect, or otherwise sense electromagnetic energy that is incident upon the respective array element. For example, one or more of the plurality of array elements 121 may receive RF energy transmitted by a legitimate communication source located at elevation, $\theta$, and azimuth, $\phi$, such as satellite communication station 102. Additionally, one or more of the plurality of array elements 121 may receive other electromagnetic energy from a plurality of other, undesirable sources (e.g., energy radiated from other communication systems, energy generated by noise sources, etc.) (not shown). In order to effectively identify signals received from legitimate communication sources, while discriminating against unwanted signals, the electromagnetic energy received by the plurality of array elements 121 must be further analyzed and processed. FIG. 3 provides a block diagram illustrating the exemplary wireless transceiver system 300 configured to perform such further analysis and processing, which includes the plurality of array elements 121, and a signal processing system 301.

As explained, wireless transceiver system 300 may be associated with one or more communication stations 102 and/or receiver units 103 and may be adapted to receive and process wireless signals incident upon each of the array elements 121 associated with wireless transceiver system 300. Specifically, wireless transceiver system 300 may be mounted or installed on each of the one or more communication stations 102 and in receiver units 103. According to one exemplary embodiment, antenna 120 and plurality of array elements 121 associated therewith, may be installed and/or arranged so as to maximize line of sight access to other communication stations 102 and/or receiver units 103.

As shown in FIG. 3, each of plurality of array elements 121 is electrically coupled to signal processing system 301 to facilitate communication of electrical signals therebetween. As such, antenna 120 is configured to deliver wireless communication signals incident upon each of the plurality of array elements to signal processing system 301 to determine the directions of arrival of signals incident upon each of the array elements 121 and to identify a target desired communication source. Similarly, signal processing system 301 is configured to deliver electrical energy (including beam pattern/complex gain information) to each of the plurality of array elements 121 to adaptively direct the radiation pattern of antenna 120 so as to effectively reinforce signals in the direction of a desired target source and suppress other undesired signals.

Transmit/receive module 320 may include one or more components electrically coupled to each of the plurality of array elements 121. Transmit/receive module 320 may be configured to perform a variety of general signal processing operations on the received signals. For example, transmit/receive module 320 may be configured to perform frequency conversion, filtering, amplification, analog-to-digital (A/D) and/or digital-to-analog (D/A) conversion, and/or multiplexing/demultiplexing of the raw signals received by array elements 121. It is contemplated that certain of such operations may be performed prior to, during, and/or after direction of arrival, beam-forming, and complex gain analysis of the signals. For example, filtering of undesired frequencies may be performed prior to the direction of arrival processing, so as to avoid unnecessary DOA analysis of signals that are of a different frequency than the target signal.

Additionally, transmit/receive module 320 may be configured to regulate the amplitude and phases of each of the plurality of array elements 121 to control the radiation pattern of antenna 120. For example, transmit/receive module 320 may be configured to adjust the amplitude and phase of electrical energy provided to each of the plurality of array elements 121, in response to the determination of the location of the target signal and desired beam pattern of the array. Accordingly, transmit/receive module 320 is configured to responsively adapt operation of antenna 120 and array elements 121 so as to maintain wireless connectivity with a target communication station 102.

GPS module 330 may be any device suitable for determining GPS coordinate information associated with the signal processing system 301 and/or a receiver unit 103 associated therewith. Alternatively or additionally, GPS module 330 may be configured to receive GPS information associated with a target source, such as communication station 102. For example, GPS module 330 may be in data communication with one or more other GPS modules associated with other devices in communication network 100. Accordingly, GPS module 330 may be configured to monitor GPS coordinate information for one or more of the other GPS modules in order to effectively locate the other devices associated with communication network 100. GPS module 330 may also be configured to distribute GPS data and coordinate information to one or more of array processor 310 and/or transmit/receive module 320, for use in processes and methods consistent with the exemplary embodiments described herein.

The use of GPS module 330 is exemplary only and not intended to be limiting. As will be explained in greater detail below, GPS module 330 may be used to provide an initial position estimate of communication state 102. This can, among other things, reduce the computational load associated with searching for communication station 102 in an estimated space. It is contemplated, however, that additional and/or different components, systems, and/or methods may be used for determining an initial position of communication station 102.

Array processor 310 may embody any microprocessor-based system that may be programmed to monitor, record, analyze, process, and/or manipulate wireless signals received by array elements 121. Specifically, array processor 310 may be configured to execute instructions for analyzing wireless signals received by array elements 121, estimate directions of arrival of one or more signals received by array elements 121, identify the position of a desired signal source, determine the complex gain parameters for each of the array elements to maximize reception of desired signals, and maintain a wireless communication link sufficient to support wireless high-speed voice/video/data services for receiver units 103.

Array processor 310 may include any type of processor-based system on which processes and methods consistent with the disclosed embodiments may be implemented. Array processor 310 may include one or more hardware and/or software components configured to execute computer-executable instructions and/or software programs. As illustrated in the exemplary embodiment of FIG. 4, array processor 310 may include one or more hardware components such as, for example, processor 311 (e.g., CPU), a random access memory (RAM) module 312, a read-only memory (ROM) module 313, a storage device 314, a database 315, an interface 316, and one or more input/output (I/O) devices 317. Alternatively and/or additionally, array processor 310 may include one or more software components such as, for example, a computer-readable medium including computer-executable instructions for performing methods consistent with certain disclosed embodiments, such as, for example, algorithms for estimating directions of arrival of a plurality of signals received by array elements 121, identifying a target source based on the plurality of received signals, and estimating a complex gain setting for each array element 121 to maximize the radiation pattern of antenna 120 in the direction of the target source. It is contemplated that one or more of the hardware components listed above may be implemented using software. Array processor 310 may include additional, fewer, and/or different components than those listed above. It is understood that the components listed above are exemplary only and not intended to be limiting.

Figure 4:
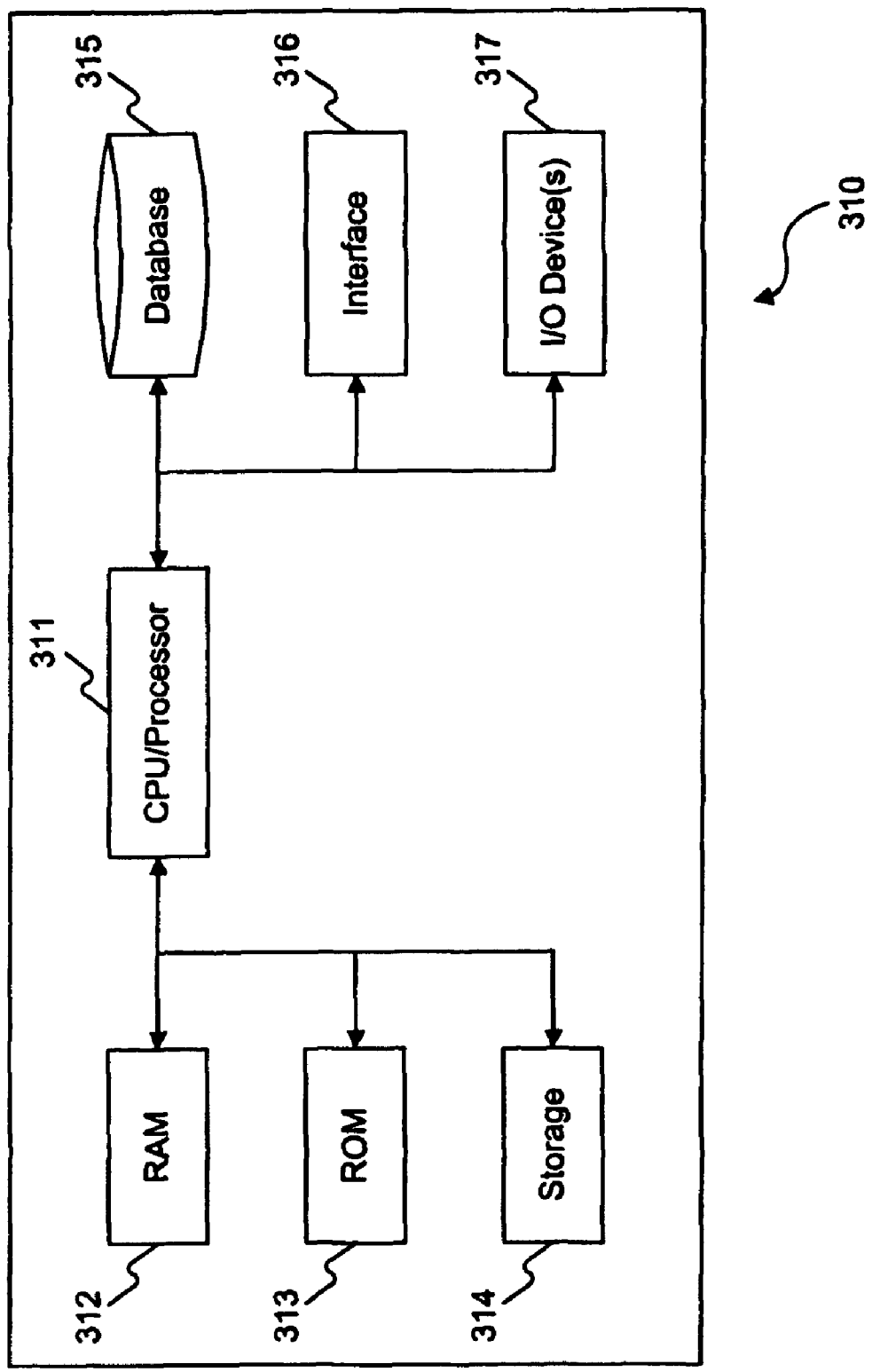
FIG. 4 provides a block diagram of an exemplary computer system associated with the signal processing system illustrated in FIG. 3.

Processor 311 may include one or more microprocessors, each configured to execute instructions and process data to perform one or more functions associated with array processor 310. As illustrated in FIG. 4, processor 311 may be communicatively coupled to RAM 312, ROM 313, storage 314, database 315, interface 316, and I/O devices 317. Processor 311 may be configured to execute sequences of computer program instructions to perform various processes, including those described in detail below. The computer program instructions may be loaded into RAM for execution by processor 311.

RAM 312 and ROM 313 may each include one or more devices for storing information associated with operations of array processor 310 and/or processor 311. For example, ROM 313 may include a memory device configured to access and store information associated with array processor 310, including information for identifying, initializing, and monitoring the operation of one or more components and subsystems of array processor 310. RAM 312 may include a memory device for storing data associated with one or more operations of processor 311. For example, ROM 313 may load instructions into RAM 312 for execution by processor 311.

Storage 314 may include any type of mass storage device configured to store information that processor 311 may need to perform processes consistent with the disclosed embodiments. For example, storage 314 may include one or more magnetic and/or optical disk devices, such as hard drives, CD-ROMs, DVD-ROMs, or any other type of mass media device.

Database 315 may include one or more software and/or hardware components that cooperate to store, organize, sort, filter, and/or arrange data used by array processor 310 and/or processor 311. For example, database 315 may be used to store and organize GPS coordinates corresponding to positions of satellite communication stations 102 in geosynchronous orbit for preliminary calibration of array elements 121, previously-estimated directions of arrival and complex gain parameters associated with target sources at a variety of GPS coordinates, and other information that may aid in initial calibration of antenna 120 and/or array elements 121 toward a target source. In accordance with one embodiment, processor 311 may access the information stored in database 315 to establish a general radiation pattern in an expected/predicted direction of arrival of signals received from the target source. It is contemplated that database 315 may store additional and/or different information than that listed above.

Interface 316 may include one or more components configured to transmit and receive data via a communication network, such as the Internet, a local area network, a workstation peer-to-peer network, a direct link network, a wireless network, or any other suitable communication platform. For example, interface 316 may include one or more modulators, demodulators, multiplexers, demultiplexers, network communication devices, wireless devices, antennas, modems, and/or any other type of device configured to enable data communication via a conventional communication network.

I/O devices 317 may include one or more components configured to communicate information with users associated with array processor 310. For example, I/O devices may include a console with an integrated keyboard and mouse to allow users to input parameters associated with array processor 310 or to configure the same. I/O devices 317 may also include a display including a graphical user interface (GUI) for outputting information on a monitor. I/O devices 317 may also include peripheral devices such as, for example, a printer for printing information associated with array processor 310, a user-accessible disk drive (e.g., a USB port, a floppy, CD-ROM, or DVD-ROM drive, etc.) that allows users to input data stored on a portable media device, a microphone, a speaker system, or any other suitable type of interface device.

Processes and methods consistent with the disclosed embodiments provide a system for estimating directions of arrival of a plurality of signals incident upon an antenna 120 (and/or a plurality of array elements 121 associated therewith), isolating a location of a target source, such as communication station 102, and estimating a complex gain for each of the plurality of array elements 121. Specifically, the systems and methods described herein provide a solution for estimating the directions of arrival of signals incident upon one or more array elements 121 without a priori knowledge of complex gains of array elements 121. Because knowledge of complex gain of each of array element 121 is unavailable in most practical applications, the techniques described herein may be implemented in commercial markets as well as other environments. Furthermore, by separately estimating the directions of arrival of signals incident upon array elements 121 and the complex gains of array elements 121, systems and methods consistent with the embodiments described herein may significantly reduce the computational complexity of the source-localization and complex gains estimation techniques associated with identifying a target source and directing an antenna array toward the target source. Such a reduction in computational complexity may reduce the amount of on-board processing power that must be dedicated to signal processing, which may, in turn, significantly reduce hardware costs, power consumption, and/or size of signal processing system 301.

Figure 5:
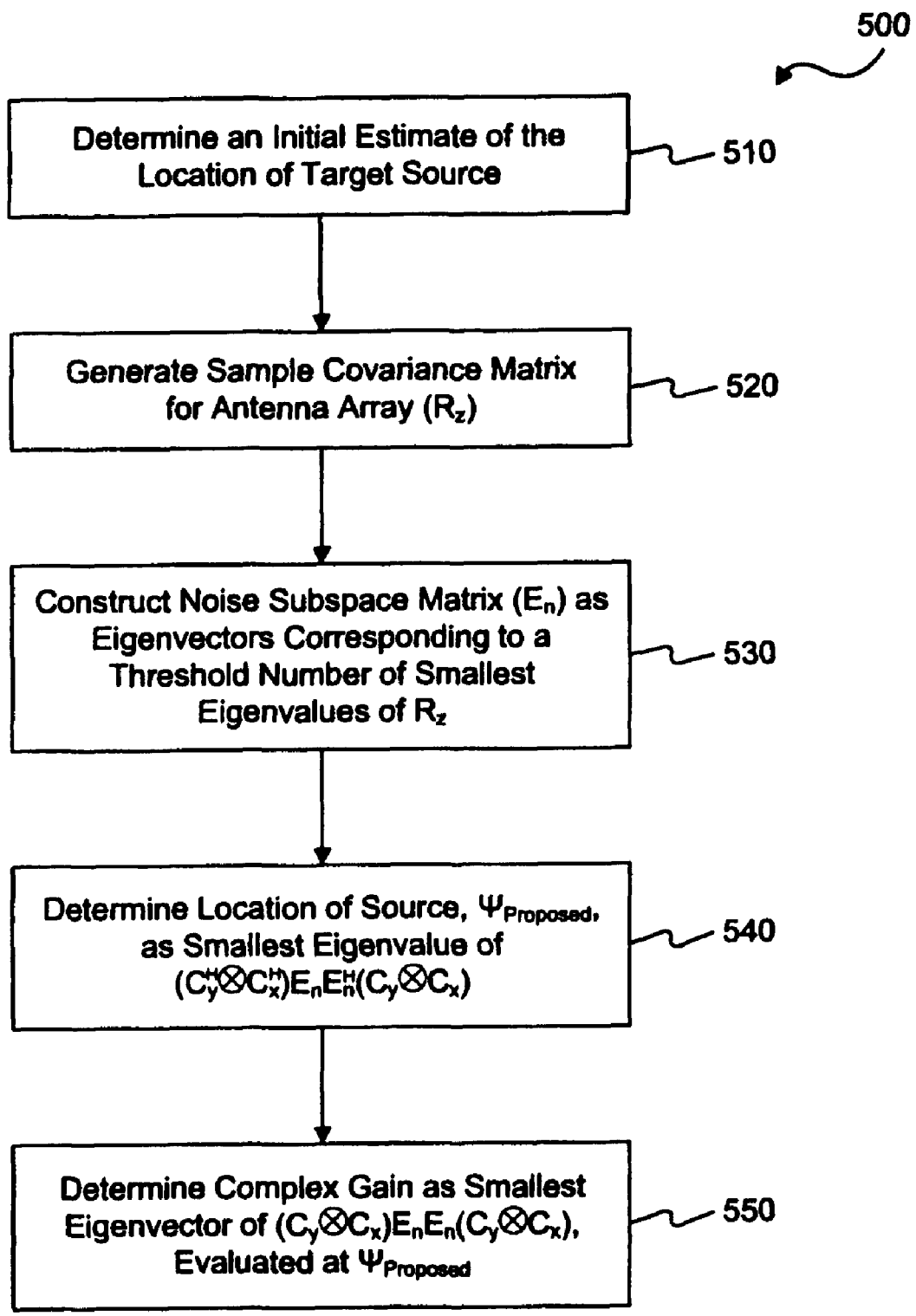
FIG. 5 provides a flowchart 500 depicting an exemplary signal processing technique for an array of antenna elements, consistent with the disclosed embodiments.

FIG. 5 provides a flowchart 500 depicting an exemplary signal processing method, which may be implemented by wireless transceiver system 300 and, more specifically, by signal processing system 301. As illustrated in FIG. 5, signal processing system 301 may be configured to determine an initial estimate of the location of a target source (step 510). This may be achieved using one or more locating schemes. For example, signal processing system 301 may be equipped with an on-board global positioning system (GPS) module 330. The on-board GPS module may be communicatively coupled to a centralized GPS database and configured to receive GPS coordinate information indicative of the location of a target source. The GPS coordinate information may be obtained via an on-board GPS module located aboard the target source, for example.

As an alternative or in addition to GPS coordinate information, signal processing system 301 may be configured to estimate azimuth and elevation angle ranges associated with a predicted location of the target source. For example, if the target source is a geosynchronous satellite transceiver, database 315 may have information associated with the geosynchronous orbit pattern of the target source. Accordingly, based on the time of day and/or GPS coordinate information, signal processing system 301 may estimate the location of the target source along its flight pattern. Signal processing system 301 may then, based on the estimated location of the target source and location of signal processing system 301, estimate a range of azimuth and elevation angles so as to provide an initial location of the target source.

Once an initial estimate of the location of the target source has been determined, signal processing system 301 may be configured to generate a sample covariance matrix for the antenna array (step 520). To do this, assume that the signal impinging upon an array of elements is a narrow-band signal and emitted from a point source in the far-field region. Using a complex signal representation, the modulated signal impinging upon the array is modeled as $$\tilde{s}(t) = s(t) e^{j2\pi f_c \tau} \qquad (1)$$

where s(t) is the modulated signal and $f_c$ is the carrier frequency. In general, the modulated signal, s(t), occupies a narrow bandwidth B, compared to the carrier frequency, i.e. $B \ll f_c$. However, in array processing schemes, the signal is assumed to be narrow-band when the signal amplitude and phase vary slowly relative to the propagation time, $\tau_i$, across the array, i.e. $|\tau_i| \ll 1/B$, where $\tau_i$ represents the propagation time of the wave from the phase reference point to the $i^{th}$ element of the array. In array signal processing, this the first part of a "narrow-band assumption" and implies that the signal only undergoes phase-shifts when propagating across the array, i.e.

$$\tilde{s}(t-\tau_i) \approx \tilde{s}(t) e^{-j2\pi f_c \tau_i} \quad (2)$$

Let $h_i(t)$ denote the impulse response of the array element. Using the above narrow-band assumption, the modulated output signal of the $i^{th}$ array element can be rewritten, in the absence of the noise, as $$\tilde{x}(t) = g_i(t) * \tilde{s}(t-\tau_i) \approx g_i(t) * \tilde{s}(t) e^{-j2\pi f_c \tau_i} \quad (3)$$

where * denotes convolution. The Fourier-transform $G_i(f)$ of $g_i(t)$ is assumed to be constant over the signal bandwidth. This is the second and last part of the "narrow-band assumption" in array signal processing. Under these assumptions, the $i^{th}$ element's output signal can be represented as $$\tilde{x}(t) = G_i(f) \tilde{s}(t) e^{-j2\pi f_c \tau_i} \quad (4)$$

where approximation has been omitted in favor of equality.

The propagation time, $\tau_i$, is a function of the elevation and azimuth of received signal (i.e. $\tau_i = \tau_i(\theta, \phi)$). For a uniform rectangular array (such as the example illustrated in FIG. 2), the time delay of the signal at the $nm^{th}$ element is $$\tau_{nm} = -\frac{(n-1)\Psi_x + (m-1)\Psi_y}{c} \quad (5)$$

with c the wave propagation speed. $\Psi_x$ and $\Psi_y$ are given by $$\Psi_x = \frac{2\pi}{\lambda} d_x \sin\Theta \cos\Phi \quad (6)$$

$$\Psi_y = \frac{2\pi}{\lambda} d_y \sin\Theta \sin\Phi \quad (7)$$

where $d_x$ and $d_y$ are the inter-element spacing along the x- and y-axis, respectively. The demodulated signal may be acquired by removing the complex carrier, $e^{j2\pi f_c t}$, and is referred to as the baseband signal. Hence, the $nm^{th}$ baseband output can be expressed as:

$$x_{nm}(t) = G_{nm} s(t) e^{-j2\pi f_c \tau_{nm}} \quad (8)$$

Assuming Q narrowband sources arriving from the angular directions $(\theta_1, \phi_1), \ldots, (\theta_Q, \phi_Q)$, superposition can be used to get the noisy received signals $$X(t) = \sum_{q=1}^{Q} A_g(\Theta_q, \Phi_q) s_q(t) + N(t) \quad (9)$$

where: $A_g = G \square A$ is the steering matrix, with $\square$ denotes Hadamard product. G being the matrix corresponding to the complex gains of the array elements, and A being the steering matrix in the case of omnidirectional elements ($[A]_{nm} = e^{-j2\pi f_c \tau_{nm}}$), $S_q$ is the signal transmitted by the $q^{th}$ source, and N is the noise matrix.

For the sake of convenience, the following notation can be introduced for the received signal model:

$$z(t) = B \cdot s(t) + n(t) \quad (10)$$

where $z(t) = \text{vec}[X(t)]$ with $\text{vec}[*]$ denoting the vector obtained by stacking the columns of the argument on top of each other, $B = [\text{vec}[A_g(\theta_1, \phi_1)], \text{vec}[A_g(\theta_2, \phi_2)], \ldots, \text{vec}[A_g(\theta_Q, \phi_Q)]]$, $s(t) = [s_1(t), \ldots, s_q(t)]^T$ is the vector of incident signals, and $n(t) = \text{vec}[N(t)]$.

The noise may be modeled as a zero-mean complex circularly symmetric spatio-temporally white Gaussian process, $$E[n(t)] = 0, E[n(t) n^H(t')] = \sigma_n^2 \delta_{t,t'} I, E[n(t) \cdot n^T(t')] = 0 \quad (11)$$

where $\sigma_n^2$ is the variance of the noise.

Assuming that the sources are mutually uncorrelated, the noise and the signals are uncorrelated and the noise as spatially and temporally white, the data model (10) allows the covariance matrix to be represented as:

$$R_z = E[z(t) z^H(t)] = R_s + \sigma_n^2 \cdot I \quad (12)$$

where $$R_s = B \cdot \Gamma_s \cdot B^H \quad (13)$$

is the noise-free covariance matrix, with $$\Gamma_s = E[s(t) s^H(t)] \quad (14)$$

the diagonal emitted signal covariance matrix. In practice, the covariance matrix, R, may be estimated as $$R_z = \frac{1}{T} \sum_{t=1}^{T} z(t) z^H(t).$$

The covariance matrix (12) can be written in terms of its eigenvalues $\lambda_k$ and eigenvectors $e_k$ as $$R_z = \sum_{k=1}^{N_x N_y} \lambda_k \cdot e_k \cdot e_k^H = E \Lambda E^H \quad (15)$$

where $\Lambda = \text{diag}(\lambda_1, \ldots, \lambda_{N_x N_y})$ and $E = [e_1, \ldots, e_{N_x N_y}]$. It can be assumed that the eigenvalues are in order of decreasing size. Since there are Q signals, $$\lambda_1 \geq \lambda_2 \geq \ldots \geq \lambda_Q > \lambda_{Q+1} = \ldots = \lambda_{N_x N_y} = \sigma_n^2 \quad (16)$$

The first Q eigenvalues can be referred to as the signal-subspace eigenvalues and the corresponding eigenvectors $E_s = [e_1, \ldots, e_Q]$ can be referred to as the signal-subspace eigenvectors. The remaining eigenvectors define a noise subspace $E_n = [e_{Q+1}, \ldots, e_{N_x N_y}]$ that does not contain any signal component. Using these results, the covariance matrix (15) can be rewritten as:

$$R_z = E_s \Lambda_s E_s^H + \sigma_n^2 E_n E_n^H. \quad (17)$$

In applications that employ antenna arrays of elements, with known complex gains, the spectral MUSIC algorithm may be used to estimate the parameter vector $\Psi = [\Psi_x, \Psi_y]^T$ as $$\hat{\Psi}_{MUSIC} = \arg\min_{\Psi} \frac{b_g^H(\Psi) \hat{E}_n \hat{E}_n^H b_g(\Psi)}{b_g^H(\Psi) b_g(\Psi)} \quad (18)$$

where $$b(\Psi) = \text{vec}[A_g(\Psi)] = \text{vec}[G \square A] \quad (19)$$

and $\hat{E}_n$ is the estimated noise subspace of dimension $N_x N_y \times (N_x N_y - Q)$.

Referring again to FIG. 5, once the initial location of the target source has been determined, signal processing system 301 may be configured to determine the sample covariance matrix, $R_z$, of the antenna array (step 520), in accordance with equation (12), for example. Once the sample covariance matrix has been determined, signal processing system 301 may construct the noise subspace matrix, $E_n$, as a threshold number of smallest eigenvalues of the noise subspace matrix corresponding to the additive noise contribution (step 530). The threshold number may be determined as $$\lambda_{threshold} = N_x N_y - N_{sat} \qquad (20)$$

where $N_x N_y$ represents the total number of array elements and $N_{sat}$ represents the number of desired sources to be discerned.

Once the noise subspace matrix has been constructed, signal processing system 301 may be configured to determine the location of the target source, $\Psi_{PROPOSED}$ (step 540). To do so, it is important to consider the general form of the array steering matrix $A_g(\psi) = G(\psi) \square A(\psi)$, and observe that:

$$b_g(\psi) = vec[A_g]$$

$$b_g(\psi) = vec[G \square \{a_x(\psi_x) \cdot a_y^T(\psi_y)\}]$$

$$b_g(\psi) = vec[C_x \cdot G \cdot C_y]$$

$$b_g(\psi) = (C_y \otimes C_x)g \qquad (21)$$

where $C_x = diag(a_x(\psi_x))$, $C_y = diag(a_y(\psi_y))$, and $g = vec[G]$. In (21), $\square$ and $\otimes$ denote the Hadamard and the Kronecker matrix products, respectively.

Substituting (21) into the MUSIC cost function (18) gives:

$$\frac{b_g^H(\Psi) \cdot \hat{E}_n \cdot \hat{E}_n^H \cdot b_g(\Psi)}{b_g^H(\Psi) \cdot b_g(\Psi)} = \frac{g^H \cdot (C_y \otimes C_x)^H \cdot \hat{E}_n \cdot \hat{E}_n^H \cdot (C_y \otimes C_x) \cdot g}{g^H \cdot (C_y \otimes C_x)^H \cdot (C_y \otimes C_x) \cdot g} \qquad (22)$$

Using the Hadamard product properties, the above MUSIC cost function can be rewritten as:

$$P(\psi; g) = \qquad (23)$$

$$\frac{b_g^H(\Psi) \cdot \hat{E}_n \cdot \hat{E}_n^H \cdot b_g(\Psi)}{b_g^H(\Psi) \cdot b_g(\Psi)} = \frac{g^H \cdot (C_y \otimes C_x)^H \cdot \hat{E}_n \cdot \hat{E}_n^H \cdot (C_y \otimes C_x) \cdot g}{g^H \cdot g}$$

Using the quadratic forms theory:

$$P_1(\psi) = \min_g P(\psi; g) = \lambda_{min}\{(C_y \otimes C_x)^H \cdot \hat{E}_n \cdot \hat{E}_n^H \cdot (C_y \otimes C_x)\} \qquad (24)$$

where $\lambda_{min}\{*\}$ denotes the minimal eigenvalue of matrix *. In addition, because $P_1(\psi) = 0$ if $\psi$ corresponds to the true parameter vector in the direction of the target source, then, the vector $\psi$ can also be estimated as follows:

$$\psi_{PROPOSED} = \arg\min_\psi det\{(C_y \otimes C_x)^H \cdot \hat{E}_n \cdot \hat{E}_n^H \cdot (C_y \otimes C_x)\} \qquad (25)$$

where $det\{*\}$ denotes the determinant of a matrix *.

Upon determination of the location of the target source, signal processing system 301 may be configured to determine the complex gains of antenna elements. For example, signal processing system 301 may estimate the complex gain vector, g, as the eigenvector associated to the smallest eigenvalue of the matrix $(C_y \otimes C_x)^H \cdot \hat{E}_n \cdot \hat{E}_n^H \cdot (C_y \otimes C_x)$, evaluated with the steering vector "aimed" at the target source (step 550). Thus, $$g_{PROPOSED} = \upsilon_{min}\{(C_y(\hat{\psi}_y) \otimes C_x(\hat{\psi}_x))^H \cdot \hat{E}_n \cdot \hat{E}_n^H \cdot (C_y(\hat{\psi}_y) \otimes C_x(\hat{\psi}_x))\} \qquad (26)$$

where $\upsilon_{min}\{*\}$ denotes the eigenvector associated with the smallest eigenvalue of a matrix *, and $\hat{\psi}_x$ are $\hat{\psi}_y$ the estimated parameters obtained from (25).

The method for determining the location of a target source and complex gain for an antenna element in the direction of the target source, as described above in connection with FIG. 5, may be repeated for each antenna element in the array of antenna elements. According to one embodiment, the method may be performed for a plurality of elements in parallel (i.e., simultaneously), in series (i.e., sequentially), or in a combination of series/parallel (i.e., a first group of elements being analyzed simultaneously after which a second group of elements may be subsequently analyzed). It is contemplated that the flexibility in the order of analysis allows signal processing system 301 to achieve an optimum level of reliability in determining direction of arrival and complex gain for the antenna array, while limiting the computational complexity that can overwhelm signal processing systems associated with large antenna arrays.

Figure 6:
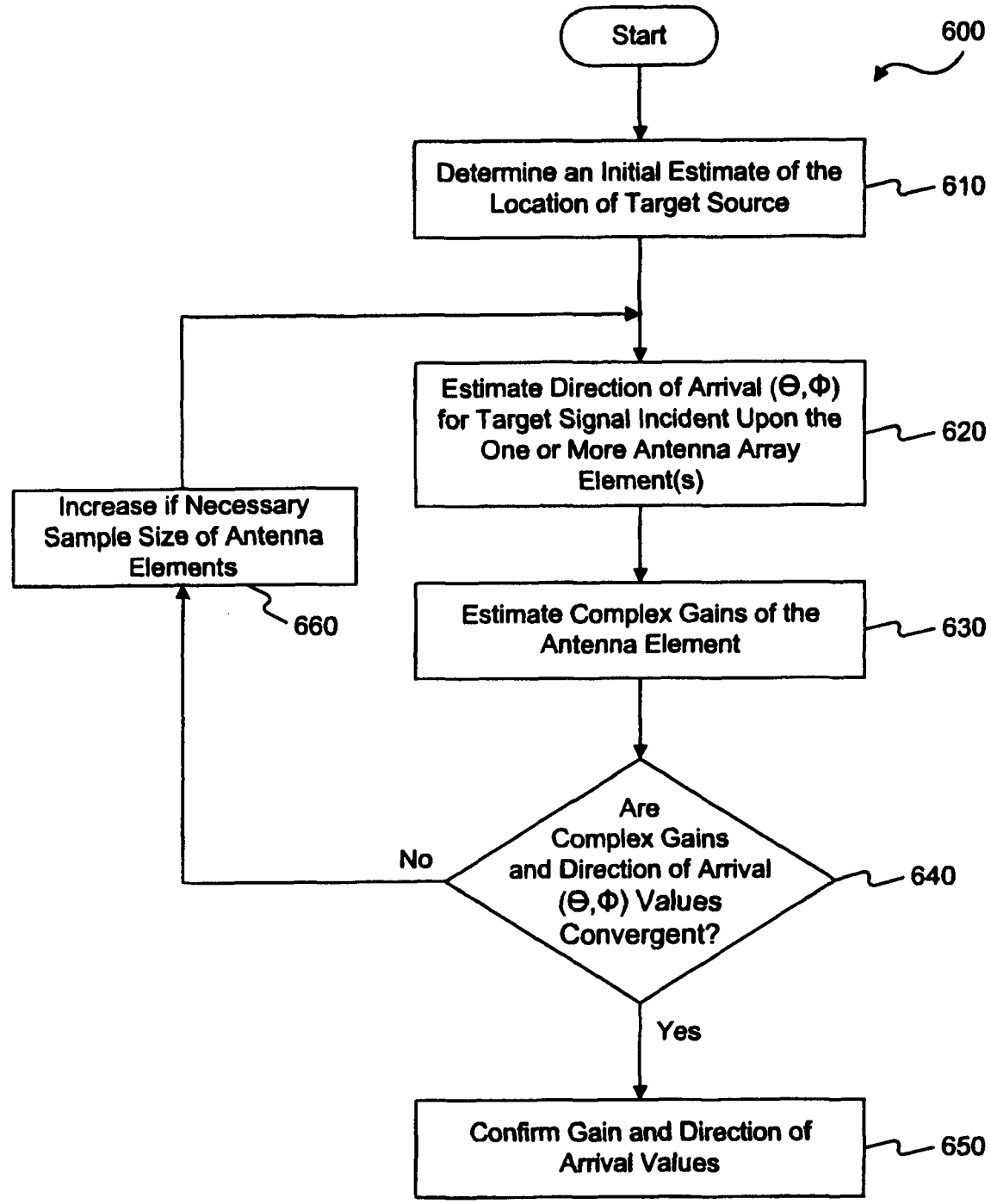
FIG. 6 provides a flowchart 600 illustrating an exemplary computer-implemented method for estimating location of a target source and complex gain settings for an antenna.

According to one exemplary embodiment, signal processing system 301 may be configured to determine the ideal sample number of antenna elements that is required to provide an acceptable level of connectivity between the antenna and the target source without unnecessarily increasing the computational burden on the system. FIG. 6 provides a flowchart 600 depicting an exemplary method for identifying an ideal sample size of array elements that is sufficient to render estimates of target source location and antenna beam patterns. As explained, because computational complexity is largely dependent upon the number of array elements that must be analyzed to render a convergent solutions for target source location and antenna beam pattern estimates, it may be advantageous to analyze data from as few array elements as possible. Accordingly, FIG. 6 illustrates a computer-implemented method that, when executed by signal processing system 301, may aid in limiting the number of array elements that are analyzed as part of the presently disclosed source localization and complex gain processing schemes.

As illustrated in the exemplary embodiment of FIG. 6, antenna signal processing system 301 may be configured to determine an initial estimate of the location of the target source (step 610). For example, according to one embodiment, antenna 120 and signal processing system 301 may each be included as part of a receiver unit 103 located on an airplane. Receiver unit 103 may be configured for high-speed wireless data connectivity with one or more satellite communication stations 102, depending upon the location of the airplane. In order to initiate connectivity, antenna 120 and/or array elements 121 of receiver unit 103 may be initially aligned with communication station 102 while the aircraft is at a reference location (i.e., a stationary location where a first location of the satellite is known), such as at an airport terminal. Based on the reference location, signal processing system 301 may be adapted to initially direct the radiation pattern of antenna 120 and array elements 121 to establish a wireless connection between receiver unit 103 and communication station 102. According to one exemplary embodiment, signal processing system 301 may be configured to retrieve a default position of a target satellite communication station 102 from memory, based on known GPS position(s) of receiver unit 103 and/or target satellite communication station 102. Alternatively or additionally, signal processing system 301 may be configured to detect an initial location of the target source based on GPS coordinate information associated with target satellite communication station 102.

Once a location of the target source has been preliminarily estimated, signal processing system 301 may be configured to select a first sample size of antenna array elements that will be analyzed to estimate the direction of arrival and complex gain for each element of the array. For instance, certain geographical locations are located more closely to a target satellite communication station 102 than other locations. Accordingly, identifying the target source in locations located close to the source may require substantially less computational effort than identifying target signals located far from the source, as the target signal may be much stronger and, therefore, easier to identify, even for a relatively small number of array elements 121. By contrast, in certain other locations it may be more difficult to identify and locate signals from the target source. In these locations, a large sampling of signal data may be required to establish a wireless connection between receiver unit 103 and a satellite communication station. Accordingly, signal processing system 301 may be configured to determine an initial sample size of array elements that are used to determine direction of arrival and complex gains estimates.

Once an initial location of the target source has been estimated and the initial sample of antenna elements that are to be analyzed has been selected, signal processing system 301 may estimate the direction of arrival of a target signal for each of the selected array elements (step 620). For the selected antenna array elements, this step may be performed in accordance with the processes and methods described above. Further, as explained, based on the direction of arrival estimates, signal processing system 301 may then estimate complex gain parameters for each of the selected array elements (step 630).

Once the direction of arrival and complex gain parameters have been estimated after several consecutive iterations, signal processing system 301 may then determine, based on the comparison, whether the estimates converge to a threshold convergence value for the direction of arrival (i.e., whether the difference between the estimates is within an acceptable limit).

According to one embodiment, the threshold convergence value for the direction of arrival and complex gain may be established based, at least in part, on a desired strength of the wireless connection between the antenna array and the target source. For example, in order to support extremely high-bandwidth applications, such as high-definition video, the threshold convergence value for the direction of arrival and complex gain may be established to require a much larger sample size than would otherwise be necessary to support low-bandwidth applications, such as voice or text-messaging. As such, the threshold convergence value may require a much smaller difference limit between direction of arrival and complex gain estimates for the initial sample number of array elements and direction of arrival and complex gain estimates for the second sample number of array elements. Thus, it is contemplated that the threshold convergence values may be adjusted to facilitate virtually any desired strength of the wireless connection.

According to another embodiment, the threshold convergence values may be established based on an estimated volume of wireless traffic in an area surrounding the antenna. For instance, if the estimated volume of wireless traffic in the area surrounding the antenna is extremely high, the threshold convergence value may be established so as to ensure sufficient reliability in detecting the legitimate target signal from among other "illegitimate" sources.

It is contemplated that, as an alternative or in addition to the embodiments described above, threshold convergence values for the direction of arrival and complex gain may be based on one or more of various other criteria. Alternatively, initial threshold convergence values may be established arbitrarily by a user or manufacturer of signal processing system 301. Consequently, the processes and methods described herein for establishing threshold convergence values are exemplary only and not intended to be limiting.

If the estimates for direction of arrival and complex gains associated with the initial and second sample sizes of array elements do not converge (step 640: No), signal processing system 301 may be configured to increase the sample size of array elements (step 660). In accordance with embodiments consistent with the present disclosure, increases in sample size may be modest (e.g., an increase of a few array elements) or substantial (e.g., an increase in a block of array elements). In one embodiment, signal processing system 301 may be configured to select the size of the increase based upon a degree of non-convergence. Although increases in the number of array elements that are analyzed may increase the computational load for signal processing system 301, such increases may nonetheless be necessary to effectively identify the target source.

If the estimates for direction of arrival and complex gain associated with consecutive iterations do converge (step 640: Yes), signal processing system 301 may confirm the beam pattern, direction of arrival values (step 650) and the required array size. Signal processing system 301 may adaptively adjust the array size in order to effectively maintain wireless connectivity between receiver unit 103 and target satellite communication station 103.

Systems and methods consistent with the disclosed embodiments provide solutions for efficiently estimating the source localization and complex gain parameters for array antennas. Such systems and methods can reduce the computational burden that is typically associated with, for example, conventional DOA estimation techniques. As will be appreciated from the present disclosure, the systems and methods described herein may facilitate the estimation of directions of arrival of signals incident upon antenna array elements and identification of a location of a target source from among a plurality of sources, without requiring a plod knowledge of complex gains of the elements, as is typically required in conventional DOA estimation systems. As a result, the embodiments described herein may significantly reduce the computational load required for a receiver unit to identify and maintain wireless connectivity with a target source, as it is based on the decoupled estimation rather than the joint estimation of the parameters. Among other advantages, such a reduction in computation load may significantly increase the speed with which the wireless transceiver adapts to changes in location, which may reduce service interruptions and increase quality of service (QoS).

Other embodiments of the present disclosure will be apparent to those skilled in the art from consideration of the specification and practice of the disclosure disclosed herein. It is intended that the specification and examples be considered as exemplary only, with a true scope and spirit of the disclosure being indicated by the following claims.

The invention claimed is:

1. A computer-implemented method for source-localization and self-calibration for an array of antenna elements, comprising:

estimating, using a processor, directions of arrival of a plurality of signals received by a plurality of antenna elements of the array of antenna elements and identifying a target signal from among the plurality of received signals; and estimating, using a processor, a complex gain of each of the plurality of antenna elements in a direction of arrival of the identified target signal, wherein the estimation of the complex gain of each of the plurality of antenna elements is performed after estimating the directions of arrival of signals received by the plurality of antenna elements.

2. The computer-implemented method of claim 1, wherein estimating directions of arrival of a plurality of signals received by the plurality of antenna elements of the array of antenna elements includes estimating directions of arrival of the plurality of signals received by a plurality of antenna elements of the array of antenna elements.

3. The computer-implemented method of claim 1, wherein estimating directions of arrival of a plurality of signals includes determining an initial estimate of a location of a target source associated with the target signal.

4. The computer-implemented method of claim 3, wherein determining an initial estimate of a location of a target source associated with the target signal includes obtaining global positioning coordinate information associated with the target source.

5. The computer-implemented method of claim 4, wherein obtaining global positioning coordinate information associated with the target source includes receiving global positioning coordinate information from the target source.

6. The computer-implemented method of claim 3, wherein determining an initial estimate of a location of a target source includes estimating an expected range of at least one of an azimuth angle and an elevation angle associated with an expected location of the target source.

7. The computer-implemented method of claim 3, wherein identifying a target signal from among the plurality of received signals includes generating a sample covariance matrix for the array of antenna elements based on the initial estimate of the location of the target source.

8. The computer-implemented method of claim 7, wherein identifying a target signal from among the plurality of received signals further includes:
analyzing the sample covariance matrix for the array of antenna elements; and
determining an estimate of the direction of arrival of the target signal based on the analysis of the sample covariance matrix for the array of antenna elements.

9. The computer-implemented method of claim 8, wherein analyzing the sample covariance matrix includes:
identifying a plurality of eigenvectors of the sample covariance matrix, each of the plurality of eigenvectors corresponding to one of a threshold number of eigenvalues of the sample covariance matrix; and
defining a noise subspace matrix as a matrix comprising the identified plurality of eigenvectors of the sample covariance matrix.

10. The computer-implemented method of claim 9, wherein determining the estimate of the direction of arrival of the target signal includes identifying an azimuth angle and an elevation angle of the target source that render the smallest eigenvalue of the matrix characterized by:

$$(C_y \otimes C_x)^H \cdot \hat{E}_n \cdot \hat{E}_n^H \cdot (C_y \otimes C_x).$$

11. The computer-implemented method of claim 10, wherein estimating the complex gain of each of the plurality of antenna elements includes identifying the complex gain as an element of the eigenvector corresponding to smallest eigenvalue of the matrix characterized by:

$$[(C_y \otimes C_x)^H \cdot \hat{E}_n \cdot \hat{E}_n^H \cdot (C_y \otimes C_x)]$$

evaluated at the identified azimuth angle and elevation angle of the target source.

12. A wireless communication system, comprising:
an antenna comprising an array of antenna elements;
a signal processing system electrically coupled to each of the plurality of array elements, the signal processing system comprising:
an array processor configured to:
estimate directions of arrival of a plurality of signals received by a plurality of antenna elements of the array of antenna elements;
identify a target signal from among the plurality of received signals; estimate a location of a target source associated with the target signal; and
estimate a complex gain of each of the plurality of antenna elements in a direction of the location of the target source, wherein the estimation of the complex gain of each of the plurality of antenna elements is performed after estimating the location of the target source.

13. The wireless transceiver system of claim 12, wherein the signal processing system further comprises a GPS module that is communicatively coupled to the array processor and configured to receive global positioning coordinate information associated with the target source.

14. The wireless transceiver system of claim 13, wherein the array processor is further configured to determine an initial estimate of the location of the target source associated with the target signal based on the global positioning coordinate information associated with the target source.

15. The wireless transceiver system of claim 12, wherein the array processor is further configured to determine an initial estimate of a location of a target source associated with the target signal by estimating an expected range of at least one of an azimuth angle and an elevation angle associated with an expected location of the target source.

16. The wireless transceiver system of claim 12, wherein the array processor is configured to identify a target signal from among the plurality of received signals by generating a sample covariance matrix for the array of antenna elements based on the initial estimate of the location of the target source.

17. The wireless transceiver system of claim 12, wherein the array processor is further configured to identify a target signal from among the plurality of received signals by:
analyzing the sample covariance matrix for the array of antenna elements; and
determining an estimate of the direction of arrival of the target signal based on the analysis of the sample covariance matrix for the array of antenna elements.

18. The wireless transceiver system of claim 17, wherein the array processor is further configured to analyze the sample covariance matrix by:
identifying eigenvectors of the sample covariance matrix; and
constructing a noise subspace as a matrix comprising the eigenvectors corresponding to an additive noise contribution.

19. The wireless transceiver system of claim 18, wherein the array processor is further configured to determine an estimate of the direction of arrival of the target signal by identifying an azimuth angle and an elevation angle of the target source that render the smallest eigenvalue of the matrix characterized by:

$$(C_y \otimes C_x)^H \cdot \hat{E}_n \cdot \hat{E}_n^H \cdot (C_y \otimes C_x).$$

20. The wireless transceiver system of claim 19, wherein the array processor is further configured to estimate the complex gain of each of the plurality of antenna elements by identifying the complex gain as an element of the eigenvector corresponding to smallest eigenvalue of the matrix characterized by:

$$[(C_y \otimes C_x)^H \cdot \hat{E}_n \cdot \hat{E}_n^H \cdot (C_y \otimes C_x)]$$

evaluated at the identified azimuth angle and elevation angle of the target source.

21. A non-transitory computer-readable medium for use on a computer system, the computer-readable medium including computer-executable instructions which, when executed by a processor, perform a method for source-localization and self-calibration for an array of antenna elements, the method comprising:
   estimating, using a processor, directions of arrival of a plurality of signals received by a plurality of antenna elements of the array of antenna elements and identifying a target signal from among the plurality of received signals; and
   estimating, using a processor, a complex gain of each of the plurality of antenna elements in a direction of arrival of the identified target signal, wherein the estimation of the complex gain of each of the plurality of antenna elements is performed after estimating the directions of arrival of signals received by the plurality of antenna elements.

22. The computer-readable medium of claim 21, wherein estimating directions of arrival of a plurality of signals received by the plurality of antenna elements of the array of antenna elements includes estimating directions of arrival of the plurality of signals received by a plurality of antenna elements of the array of antenna elements.

23. The computer-readable medium of claim 21, wherein estimating directions of arrival of a plurality of signals includes determining an initial estimate of a location of a target source associated with the target signal.

24. The computer-readable medium of claim 23, wherein determining an initial estimate of a location of a target source associated with the target signal includes obtaining global positioning coordinate information associated with the target source.

25. The computer-readable medium of claim 24, wherein obtaining global positioning coordinate information associated with the target source includes receiving global positioning coordinate information from the target source.

26. The computer-readable medium of claim 23, wherein determining an initial estimate of a location of a target source includes estimating an expected range of at least one of an azimuth angle and an elevation angle associated with an expected location of the target source.

27. The computer-readable medium of claim 23, wherein identifying a target signal from among the plurality of received signals includes generating a sample covariance matrix for the array of antenna elements based on the initial estimate of the location of the target source.

28. The computer-readable medium of claim 27, wherein identifying a target signal from among the plurality of received signals further includes: analyzing the sample covariance matrix for the array of antenna elements; and determining an estimate of the direction of arrival of the target signal based on the analysis of the sample covariance matrix for the array of antenna elements.

29. The computer-readable medium of claim 28, wherein analyzing the sample covariance matrix includes: identifying eigenvectors of the sample covariance matrix; and constructing a noise subspace as a matrix comprising the eigenvectors corresponding to an additive noise contribution.

30. The computer-readable medium of claim 29, wherein determining the estimate of the direction of arrival of the target signal includes identifying an azimuth angle and an elevation angle of the target source that render the smallest eigenvalue of the matrix characterized by:

$$(C_y \otimes C_x)^H \cdot \hat{E}_n \cdot \hat{E}_n^H \cdot (C_y \otimes C_x).$$

31. The computer-readable medium of claim 30, wherein the array processor is further configured to estimate the complex gain of each of the plurality of antenna elements by identifying the complex gain as an element of the eigenvector corresponding to smallest eigenvalue of the matrix characterized by:

$$[(C_y \otimes C_x)^H \cdot \hat{E}_n \cdot \hat{E}_n^H \cdot (C_y \otimes C_x)]$$

evaluated at the identified azimuth angle and elevation angle of the target source.

32. A method for determining a location of a target source and estimating complex gains for an array of antenna elements based on the location of the target source, the method comprising:
   executing instructions on at least one processor to:
      select a sample number of antenna elements to be analyzed;
      determine an initial estimate of a location of a target source;
      estimate directions of arrival of a first plurality of signals received by the selected antenna elements;
      identify a target signal from among the first plurality of received signals;
      estimate direction of arrival and complex gain parameters associated with each of the selected antenna elements based on the target signal identified from among the first plurality of received signals;
      estimate directions of arrival of a second plurality of signals received by the selected antenna elements;
      identify the target signal from among the second plurality of received signals;
      re-estimate direction of arrival and complex gain parameters associated with each of the selected antenna elements based on the target signal identified from among the second plurality of received signals;
      determine whether the estimated direction of arrival and complex gain parameters and the re-estimated direction of arrival and complex gain parameters converge to threshold values; and
      establish, for each antenna element of the array of antenna elements, direction of arrival and complex gain parameters as the estimated direction of arrival and complex gain parameters for the selected antenna elements if the estimated and re-estimated parameters converge to threshold values.

33. The method of claim 32, further including selecting a second sample number of antenna elements to be analyzed if the estimated direction of arrival and complex gain parameters and the re-estimated direction of arrival and complex gain parameters do not converge to threshold values, wherein the second sample number of antenna elements is greater than the sample number of antenna elements.

34. The method of claim 32, wherein the estimation of the complex gain of each of the plurality of antenna elements is performed after estimating the directions of arrival of signals received by the respective antenna element.

* * * * *